(12) United States Patent
Chien et al.

(10) Patent No.: US 8,675,474 B2
(45) Date of Patent: Mar. 18, 2014

(54) METHOD AND SYSTEM FOR HANDLING ERROR IN LPP MESSAGES EXCHANGE

(75) Inventors: Ho-Sung Chien, Taoyuan County (TW); Mamadou Kone, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 96 days.

(21) Appl. No.: 13/314,611

(22) Filed: Dec. 8, 2011

(65) Prior Publication Data
US 2012/0147732 A1 Jun. 14, 2012

Related U.S. Application Data

(60) Provisional application No. 61/421,752, filed on Dec. 10, 2010.

(51) Int. Cl.
*H04L 12/26* (2006.01)

(52) U.S. Cl.
USPC ........... 370/216; 370/252; 370/310; 370/329; 370/331; 455/418

(58) Field of Classification Search
CPC .................................................... H04L 1/1809
USPC ................. 370/216, 252, 310, 329, 330, 331; 455/418, 422.1, 456.2, 561, 562.1
See application file for complete search history.

(56) References Cited

U.S. PATENT DOCUMENTS

| | | | |
|---|---|---|---|
| 5,490,152 A * | 2/1996 | Gregg et al. | 714/748 |
| 5,754,754 A * | 5/1998 | Dudley et al. | 714/18 |
| 6,335,933 B1 * | 1/2002 | Mallory | 370/394 |
| 6,570,885 B1 * | 5/2003 | Gregg | 370/428 |
| 6,662,330 B1 * | 12/2003 | Hershey | 714/748 |
| 6,697,331 B1 * | 2/2004 | Riihinen et al. | 370/236 |
| 7,430,206 B2 * | 9/2008 | Terry et al. | 370/394 |
| 7,979,768 B2 * | 7/2011 | Sammour et al. | 714/748 |
| 8,018,890 B2 * | 9/2011 | Venkatachalam et al. | 370/315 |
| 8,184,570 B2 * | 5/2012 | Chun et al. | 370/312 |
| 8,208,944 B2 * | 6/2012 | Kim et al. | 455/456.1 |
| 8,320,250 B2 * | 11/2012 | Speight | 370/235 |
| 8,391,886 B1 * | 3/2013 | Thaper | 455/456.1 |
| 2002/0013853 A1 * | 1/2002 | Baber et al. | 709/232 |
| 2003/0174662 A1 * | 9/2003 | Malkamaki | 370/310 |
| 2008/0192674 A1 | 8/2008 | Wang et al. | |

(Continued)

OTHER PUBLICATIONS

Tanenbaum A S Ed—Tanenbaum A S: "Computer networks, The Data Link Layer", Jan. 1, 1996, Computer Networks (Third Edition), XP002271205, pp. 175-242.

(Continued)

*Primary Examiner* — Andrew Lai
*Assistant Examiner* — Andrew C Lee
(74) *Attorney, Agent, or Firm* — Birch, Stewart, Kolasch & Birch, LLP (57) ABSTRACT

A system and method for handling an error in a LTE Positioning Protocol (LPP) transaction is provided. The method includes the steps of: receiving, by a receiver, at least one of a plurality of LPP messages from a sender, wherein each of the LPP messages has a sequence number; returning, by the receiver, an acknowledgment to the sender for each of the at least one received LPP message; returning, by the receiver, an error indication to the sender when the receiver detects an error in the at least one received LPP message; and receiving, by the receiver, at least one of the at least one received LPP message retransmitted by the sender.

19 Claims, 6 Drawing Sheets

(56) References Cited

U.S. PATENT DOCUMENTS

| | | |
|---|---|---|
| 2008/0219204 A1 | 9/2008 | Lee et al. |
| 2009/0086657 A1* | 4/2009 | Alpert et al. ............... 370/310 |
| 2009/0216846 A1* | 8/2009 | Burroughs et al. .......... 709/206 |
| 2009/0253440 A1* | 10/2009 | Edge ........................... 455/456.2 |
| 2009/0311987 A1* | 12/2009 | Edge et al. ................. 455/404.1 |
| 2010/0013702 A1* | 1/2010 | Lin et al. ................. 342/357.02 |
| 2010/0077272 A1* | 3/2010 | Peisa et al. ................... 714/748 |
| 2010/0149026 A1* | 6/2010 | Farmer et al. ............ 342/357.03 |
| 2010/0192034 A1* | 7/2010 | Chhaya et al. ............... 714/748 |
| 2010/0234071 A1* | 9/2010 | Shabtay et al. ............ 455/562.1 |
| 2010/0254320 A1* | 10/2010 | Aoyama ....................... 370/329 |
| 2010/0318869 A1* | 12/2010 | Kashima ....................... 714/748 |
| 2010/0322177 A1* | 12/2010 | Luo et al. ..................... 370/329 |
| 2010/0331012 A1* | 12/2010 | Zhang ........................ 455/456.2 |
| 2010/0331013 A1* | 12/2010 | Zhang ........................ 455/456.2 |
| 2011/0039577 A1* | 2/2011 | Stern-Berkowitz et al. .......................... 455/456.1 |
| 2011/0039578 A1* | 2/2011 | Rowitch et al. ............. 455/456.1 |
| 2011/0117925 A1* | 5/2011 | Sampath et al. ............ 455/456.1 |
| 2011/0143771 A1* | 6/2011 | Edge et al. ................. 455/456.1 |
| 2011/0154146 A1* | 6/2011 | Shin et al. ..................... 714/749 |
| 2011/0159886 A1* | 6/2011 | Kangas et al. .............. 455/456.1 |
| 2011/0205122 A1* | 8/2011 | Siomina et al. ................ 342/387 |
| 2011/0207450 A1* | 8/2011 | Siomina et al. ............ 455/422.1 |
| 2012/0020320 A1* | 1/2012 | Issakov et al. ................ 370/330 |

OTHER PUBLICATIONS

3GPP TS 36.322 version 8.8.0 Release 8 (Jul. 2010); 42 pages.
3GPP TS 36.355 version 9.2.1 Release 9 (Jul. 2010); 114 pages.
Telcordia Applied Research; OMA Location Working Group Update; May 11, 2010; Version 1.0; pp. 1-13.

\* cited by examiner

METHOD AND SYSTEM FOR HANDLING ERROR IN LPP MESSAGES EXCHANGE

CROSS REFERENCE TO RELATED APPLICATIONS

This application claims the benefit of U.S. Provisional Application No. 61/421,752, filed on Dec. 10, 2010, the entirety of which is incorporated by reference herein.

BACKGROUND OF THE INVENTION

1. Field of the Invention

The present invention relates to LTE Positioning Protocol (LPP), and in particular relates to a system and method for handling an error in LPP messages exchange.

2. Description of the Related Art

Figure 1:
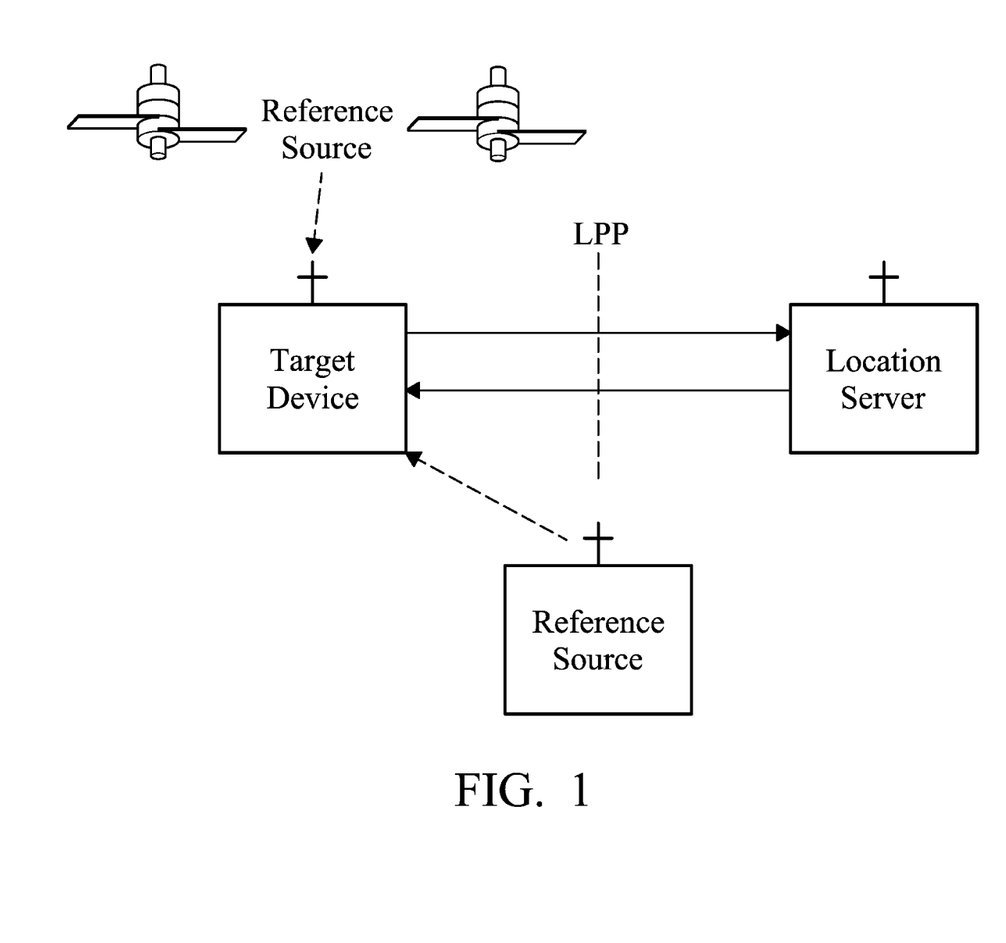
FIG. 1 is a diagram for illustrating the LPP configuration for control plane positioning in an E-UTRAN.

3GPP (3rd Generation Partnership Project) LPP (Long Term Evolution Positioning Protocol) is used in point-to-point systems between a location server (e.g. Evolved Serving Mobile Location Center (E-SMLC)) and a target device (e.g. a UE accessing E-UTRAN) in order to position the target device using position-related measurements obtained from one or more reference sources. FIG. 1 shows the LPP configuration for control plane positioning in an E-UTRAN (Evolved Universal Terrestrial Radio Access Network).

An LPP session is used between a location server and a target device in order to obtain location related measurements or a location estimate or to transfer assistance data. A single LPP session is used to support a single location request (e.g., for a single MT-LR, MO-LR or NI-LR). Multiple LPP sessions can be used between the same endpoints to support multiple different location requests. Each LPP session comprises one or more LPP transactions, with each LPP transaction performing a single operation (e.g. capability exchange, assistance data transfer, or location information transfer). In an E-UTRAN, the LPP transactions are realized as LPP procedures.

Each LPP transaction involves the exchange of one or more LPP messages between the location server and the target device. The general format of an LPP message consists of a set of common fields followed by a body. The body (which may be empty) contains information specific to a particular message type. Each message type contains information specific to one or more positioning methods and/or information common to all positioning methods. The common fields are shown in Table 1.

TABLE 1

| Field | Role |
|---|---|
| Transaction ID | Identify messages belonging to the same transaction |
| Transaction End Flag | Indicate when a transaction (e.g. one with periodic responses) has ended |
| Sequence Number | Enable detection of a duplicate LPP message at a receiver |
| Acknowledgement | Enable an acknowledgement to be requested and/or returned for any LPP message |

However, LPP is a positioning protocol for an E-UTRAN control plane. Reliable transport functionality of the LPP is not used in the user-plane solution. Therefore, LPP elementary messages (e.g. Request and Provision of Capabilities and Location Information and Assistance Data) of LPP Procedures each include a container, and an external Protocol Data Unit (EPDU), which can be used for standardization for outside 3GPP to define their own extensions to LPP messages.

The Open Mobile Alliance Location (OMA LOC) group (OMA-TS-LPPe-V1_0) works on LPP extension (LPPe).

Figure 2:
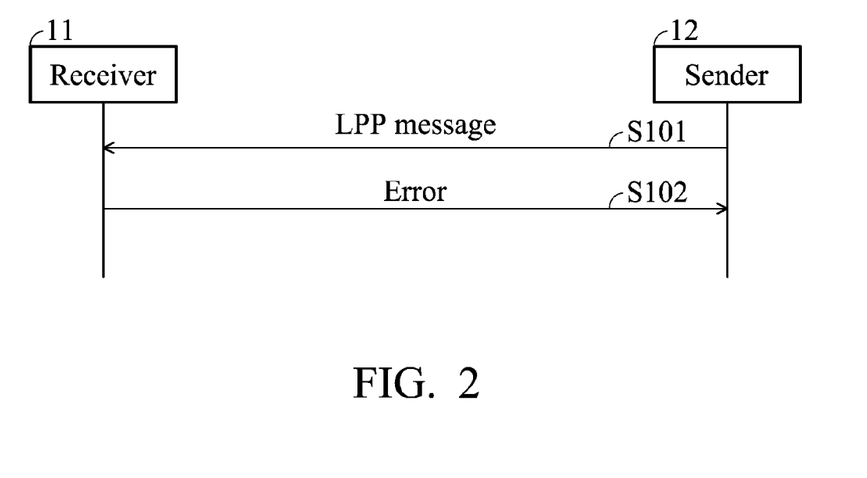
FIG. 2 is a diagram for illustrating the LPP error handling procedure.

LPP procedures include a capabilities transfer procedure, assistance data transfer procedure, location information transfer procedure, error handling procedure and abort procedure. FIG. 2 is a diagram for illustrating the LPP error handling procedure. First, a sender 12 sends an LPP message to the receiver 11 in step S101. If the receiver 11 detects that the LPP message in S101 contains an error, the receiver 11 returns an Error message in step S102 to the sender 12 indicating the error or errors and discards the LPP message received in S101. Upon receiving an Error message, the sender 12 aborts ongoing procedures associated with the LPP message or restarts the aborted procedure in response to error information.

As mentioned above, during normal LPP (e.g. Capabilities Transfer, Assistance Data Transfer, Location Information Transfer) procedures, if there are many (e.g. more than one) messages in the same transaction and an error happens, the receiver aborts ongoing procedures associated with the LPP-Transaction ID indicated in the message. However, earlier successfully delivered/acknowledged messages in this transaction will be discarded.

In another situation, if an LPP/LPPe message is too large to be transferred on the user plane, a segmented message can be used. During LPP/LPPe transfer procedures, whenever a receiver detects an error in a received segment of the LPP messages from the sender, the receiver may return an LPP Error indication to the sender indicating the error. When this happens, the transfer is terminated, which means earlier delivered/acknowledged segments of the LPP/LPPe messages will be discarded. This is an undesired circumstance, especially when the receiver has successfully received (or acknowledged) a lot of sequential segments of the LPP/LPPe messages when the error happened. The termination of the transfer may cause a lot of wasted message transmissions.

Therefore, it is desirable to have a flexible way for recovering from an LPP error message in the LPP messages exchange without aborting the ongoing transfer of LPP information, so that transactions of the LPP messages may be coordinated to avoid aborting the ongoing transfer of LPP information and reduce the waste of discarding the earlier delivered/acknowledged LPP messages because of the LPP error.

BRIEF SUMMARY OF THE INVENTION

In one exemplary embodiment, the disclosure is directed to a method for handling an error in Long Term Evolution Positioning Protocol (LPP) messages exchange, comprising: receiving, by a receiver, at least one of a plurality of LPP messages from a sender, wherein each of the LPP messages has a sequence number; returning, by the receiver, an acknowledgment to the sender for each of the at least one received LPP message; returning, by the receiver, an error indication to the sender when the receiver detects an error in the at least one received LPP message; and receiving, by the receiver, at least one of the at least one received LPP message retransmitted by the sender.

In another exemplary embodiment, the disclosure is directed to a method for handling an error in Long Term Evolution Positioning Protocol (LPP) messages exchange, comprising: receiving, by a receiver, at least one of a plurality of message segments of a LPP extension (LPPe) message from a sender, wherein each of the message segments has a segment number; returning, by the receiver, an acknowledgment to the sender for each of the at least one received message segment; returning, by the receiver, an error indication to the sender when the receiver detects an error in the at least one received message segment; and receiving, by the receiver, at least one of the at least one received message segment retransmitted by the sender.

In one exemplary embodiment, the disclosure is directed to a system for handling an error in Long Term Evolution Positioning Protocol (LPP) messages exchange, comprising: a sender, transmitting at least one of a plurality of LPP messages, wherein each of the LPP messages has a sequence number; and a receiver, receiving the at least one of the LPP messages and returning an acknowledgment to the sender for each of the at least one received LPP message; wherein the receiver returns an error indication to the sender when the receiver detects an error in the at least one received LPP message, and the sender retransmits at least one of the at least one received LPP message to the receiver.

In another exemplary embodiment, the disclosure is directed to a system for handling an error in Long Term Evolution Positioning Protocol (LPP) messages exchange, comprising: a sender, transmitting at least one of a plurality of message segments of a LPP extension (LPPe) message, wherein each of the message segments has a segment number; and a receiver, receiving the at least one of the message segments and returning an acknowledgment to the sender for each of the at least one received message segment; wherein the receiver returns an error indication to the sender when the receiver detects an error in the at least one received message segment, and the sender retransmits at least one of the at least one received message segment to the receiver.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
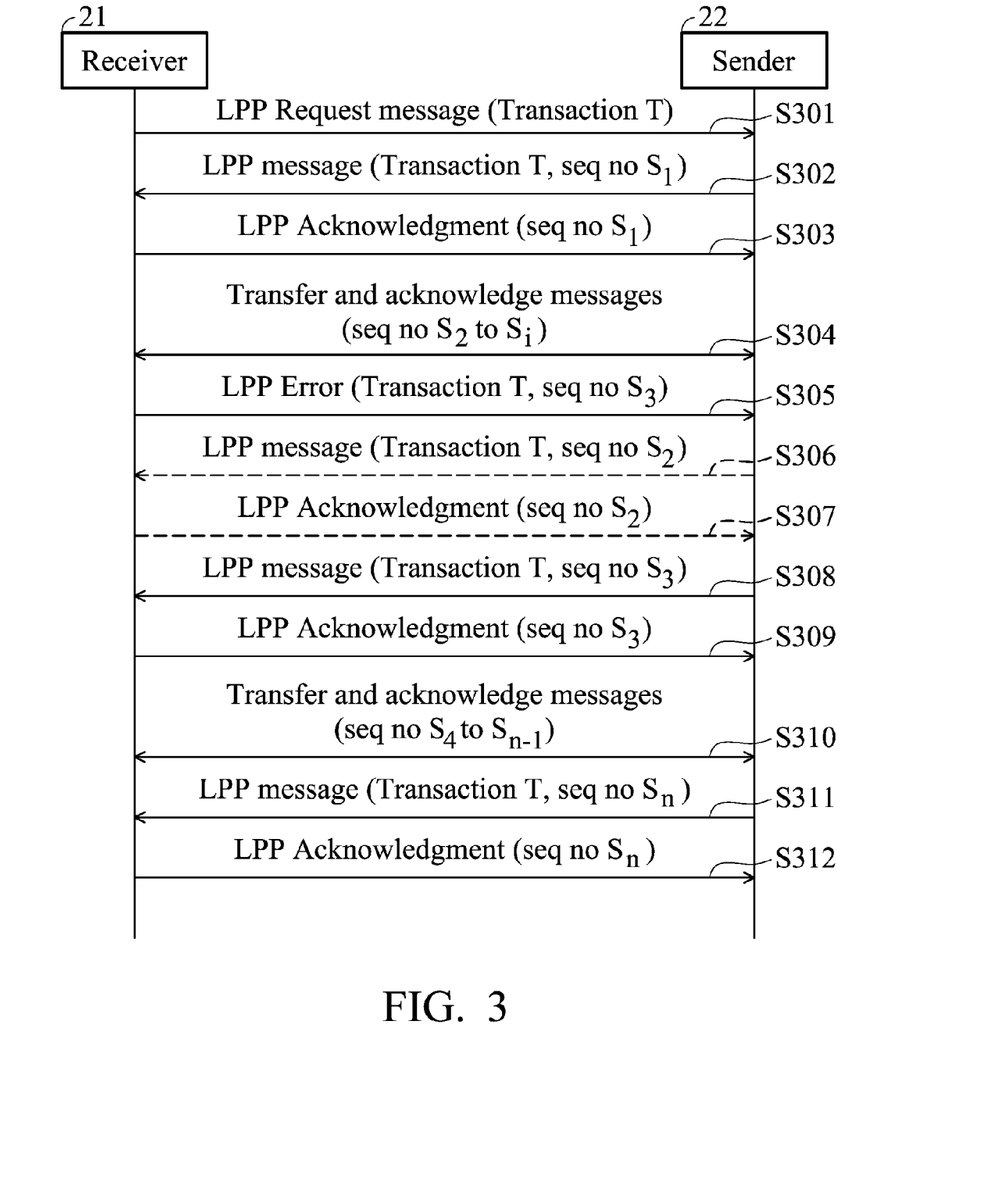
FIG. 3 is a diagram for illustrating an LPP message transfer procedure with resume capability based on an LPP error according to an embodiment of the invention.

During normal LPP (e.g. Capabilities Transfer, Assistance Data Transfer, Location Information Transfer) procedures for the control plane, the sender transmits many (e.g. more than one) messages in the same transaction to the receiver. FIG. 3 is a diagram for illustrating an LPP message transfer procedure with resume capability based on an LPP error according to an embodiment of the invention. As shown in FIG. 3, there is merely a receiver 21 and a sender 22 in this transfer procedure, wherein this transfer procedure may be used on the control plane for LPP reliable transport. In this embodiment, the receiver 21 sends an LPP Request message to the sender 22 as part of a new transaction with a transaction ID T in step S301.

The sender 22 sends the first message of the LPP messages carrying a sequence number $S_1$ to the receiver 21 in step S302. The first message with the sequence number $S_1$ includes a transaction ID T that is the same as in step S301, if step S301 occurred and does not indicate that the transaction T has ended. The first message with the sequence number $S_1$ requests for an LPP Acknowledgment.

Then, the receiver 21 recognizes that the LPP message will be transferred in a sequence of the LPP messages from the indication of the first message in step S302 and that the transaction T has not ended. The receiver 21 acknowledges receipt of the first message in step S302 by returning an LPP Acknowledgment to the sender 22 in step S303. The receiver 21 may use the LPP Acknowledgment to control the transmit flow of the sender 22—e.g. the receiver 21 may delay sending the LPP Acknowledgment until the receiver 21 is ready to receive the next message. It is noteworthy that, the LPP Acknowledgment only confirms receipt of the first message with the sequence number $S_1$ in step S302 and does not confirm that the first message was necessarily correct (e.g. decodable).

The sender 22 transfers and the receiver 21 acknowledges the LPP messages with sequence numbers $S_2$ to $S_i$ by repeating steps S302 and S303 in step S304. At any time during the transfer, either end may abort the transfer by sending an LPP Abort message to the other end. If the receiver 21 detects an error in a received LPP message from the sender 22, it may return an LPP Error indication to the sender 22 indicating the error including the transaction ID and the sequence number in step S305 (e.g., the sequence number is $S_3$ in step S305) and will not abort the transaction. After receiving the LPP Error indication, the sender 22 does not terminate the transfer. Instead, the sender 22 decides how to resume the transfer of the LPP messages. In one embodiment, the sender 22 may decide to retransmit a part of the LPP messages prior to and including the message corresponding to the received sequence number $S_3$ sent in the LPP Error indication. This may reduce the traffic load of transferring LPP messages when the sender 22 considers the error type to not be critical. For example, the sender 22 retransmits the LPP messages and the receiver 21 acknowledges the LPP messages with sequence numbers $S_2$ to $S_3$ in steps S306 to step S309. In another embodiment, the sender 22 may decide to retransmit the message of the LPP messages corresponding to the received sequence number $S_3$ sent in the LPP Error indication in step S308 (i.e., step S306 and step S307 can be cancelled). In another embodiment, the sender 22 may retransmit all messages (e.g., the LPP messages with the sequence numbers $S_1$ to $S_3$) of the LPP messages prior to and including the message corresponding to the received sequence number $S_3$ sent in the LPP Error indication (not shown in FIG. 3). Then, the sender 22 transfers and the receiver 21 acknowledges the LPP messages with the sequence numbers $S_4$ to $S_{n-1}$ by repeating steps S302 and S303 in step S310. Next, the sender 22 transfers the last ($n_{th}$) message of the LPP messages with the sequence number $S_n$ and requests for an LPP Acknowledgment from the receiver 21 in step S311. The last message sent by the sender 22 includes an indication for ending the transaction T. Finally, the receiver 21 acknowledges the last message and ends the transaction in step S312.

In another embodiment, if an LPP/LPPe message has a large volume, segmented message transfer can be used. Please note that in this invention, the term LPP/LPPe, as defined in the specifications from the standard organizations (for example, Open Mobile Alliance), stands for LPPe. Both terms LPP/LPPe and LPPe can be equivalently used in this invention. Please refer to FIG. 4, which shows a diagram illustrating an LPP/LPPe segmented messages transfer procedure with resume capability based on an LPP Error according to an embodiment of the invention. The LPP/LPPe segmented messages transfer procedure is quite similar to the LPP messages transfer procedure, and reference may be made to the steps of the LPP messages transfer procedure in FIG. 3, for most of the LPP/LPPe segmented messages transfer procedure in FIG. 4.

Figure 4:
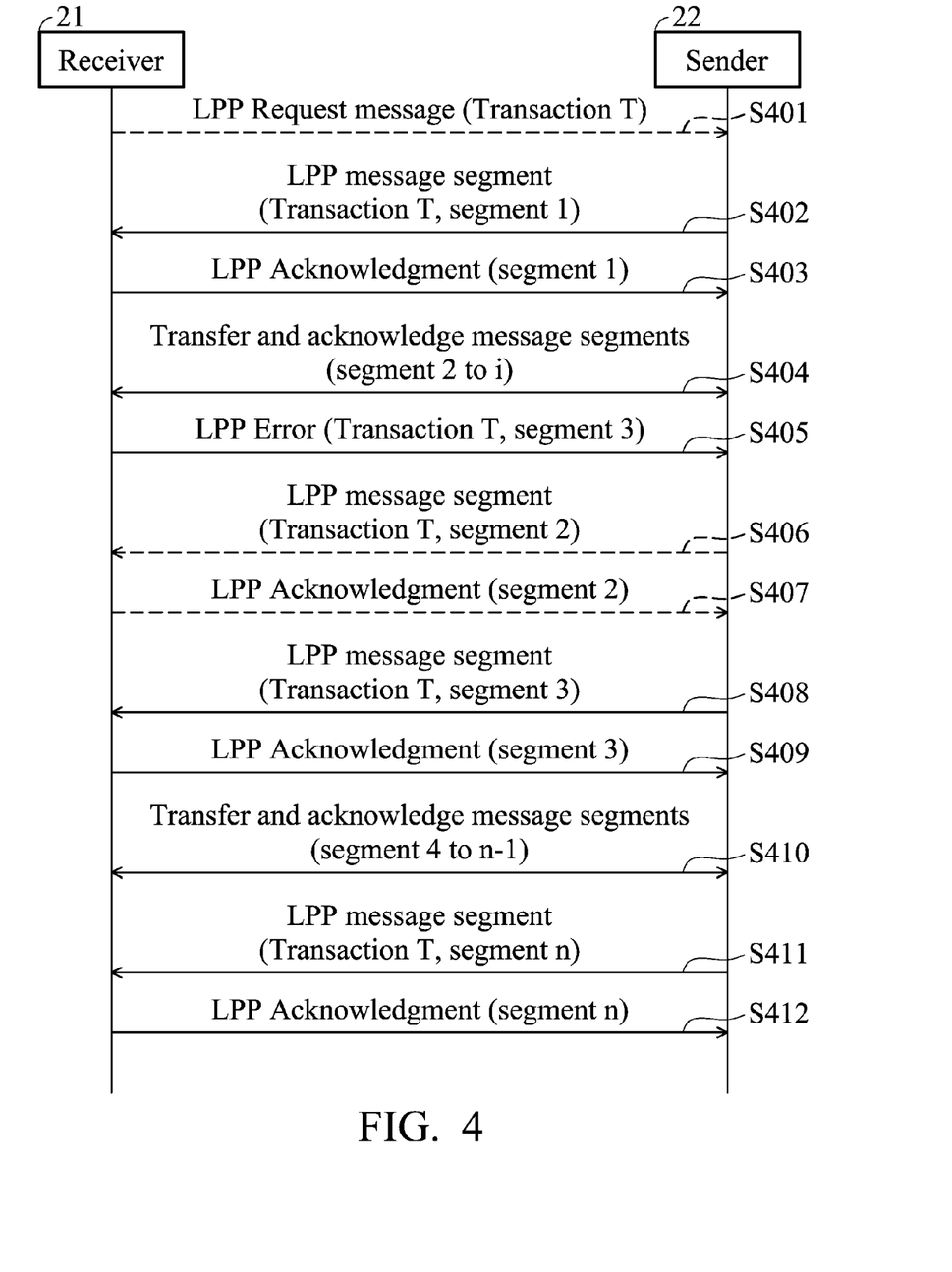
FIG. 4 is a diagram for illustrating an LPP/LPPe segmented messages transfer procedure with resume capability based on an LPP error according to an embodiment of the invention.

FIG. 4 is a diagram for illustrating an LPP/LPPe segmented messages transfer procedure with resume capability based on an LPP Error according to an embodiment of the invention. As shown in FIG. 4, there is merely a receiver 21 and a sender 22 in this transfer procedure, wherein this transfer procedure may be used on the user plane for LPP reliable transport. In this embodiment, the receiver 21 sends an LPP Request message to the sender 22 as part of a new transaction with a transaction ID T in step S401. The receiver 21 may include a preference to transfer the LPP messages in a segmented form. Note that such a preference is not mandatory for the sender 22 (i.e., the step S401 can be ignored).

The sender 22 may divide the LPP/LPPe message to be transferred to the receiver 21 into n segments. Each segment of the LPP/LPPe message must be capable of being transferred in a well formed LPP/LPPe message (i.e., a message that can be decoded and interpreted independently of any other message). The sender 22 sends the first segment of the LPP/LPPe messages carrying a reliable transport segment number 1 to the receiver 21 in step S402. The segment includes a transaction ID T that is the same as in step S401, if step S401 occurred and does not indicate that the transaction T has ended. The first segment requests for an LPP reliable transport Acknowledgment.

Then, the receiver 21 recognizes that the LPP/LPPe message will be transferred in a segment of the LPP/LPPe message from the indication in step S402 that the transaction T has not ended. The receiver 21 acknowledges receipt of the first segment in step S402 by returning an LPP Acknowledgment to the sender 22 in step S403. The receiver 21 may use the LPP Acknowledgment to control the transmit flow of the sender 22—e.g. the receiver 21 may delay sending the LPP Acknowledgment until the receiver 21 is ready to receive the next message segment. It is noteworthy that, the LPP Acknowledgment only confirms receipt of the first segment in step S402 and does not confirm that the first segment was necessarily correct (e.g. decodable).

The sender 22 transfers and the receiver 21 acknowledges the LPP/LPPe message segments with the segment numbers 2 to i by repeating steps S402 and S403 in step S404. At any time during the transfer, either end may abort the transfer by sending an LPP Abort message to the other end. If the receiver 21 detects an error in a received LPP/LPPe message segment from the sender 22, it may return an LPP Error indication to the sender 22 indicating the error including the transaction ID and the segment number in step S405 (e.g., the segment number is 3 in S405) and will not abort the transaction. After receiving the LPP Error indication, the sender 22 does not terminate the transfer. Instead, the sender 22 decides how to resume the transfer of the LPP/LPPe message segments. In one embodiment, the sender 22 may decide to retransmit a part of the segments of the LPP/LPPe message prior to and including the segment corresponding to the received segment number 3 sent in the LPP Error indication. This may reduce the traffic load of transferring LPP/LPPe message segments when the sender 22 considers the error type to not be critical. For example, the sender 22 retransmits the segment of the LPP/LPPe message and the receiver 21 acknowledges the segments with segment numbers 2 to 3 in steps S406 to S409. In another embodiment, the sender 22 may decide to retransmit the segment of the LPP/LPPe message corresponding to the received segment number 3 sent in the LPP Error indication in step S408 (i.e., step S406 and S407 can be cancelled). In another embodiment, the sender 22 may retransmit all segments (e.g., the segments with segment numbers 1 to 3) of the LPP/LPPe message prior to and including the segment corresponding to the received segment number 3 sent in the LPP Error indication (not shown in FIG. 4). Then, the sender 22 transfers and the receiver 21 acknowledges the segments with the segment numbers 4 to n−1 by repeating steps S402 and S403 in step S410. Next, the sender 22 transfers the last ($n_{th}$) segment of the LPP/LPPe message with the segment number n and requests for an LPP Acknowledgment from the receiver 21 in step S411. The last segment sent by the sender 22 includes an indication for ending the transaction T. Finally, the receiver 21 acknowledges the last segment and ends the transaction in step S412.

Figure 5:
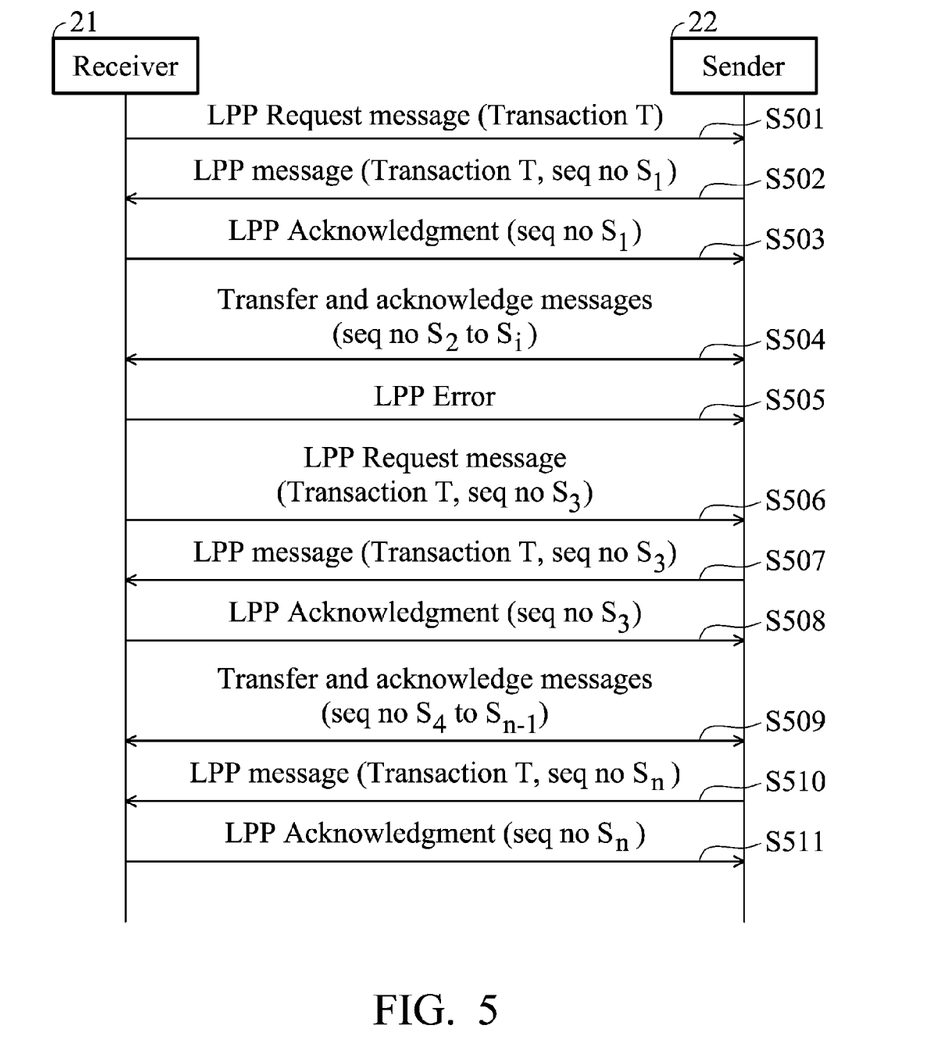
FIG. 5 is a diagram for illustrating an LPP message transfer procedure with resume capability based on a request made by a receiver according to an embodiment of the invention.

FIG. 5 is a diagram for illustrating an LPP message transfer procedure with resume capability based on the receiver request according to an embodiment of the invention. As shown in FIG. 5, there is merely a receiver 21 and a sender 22 in this transfer procedure, wherein the sender 22 transmits many (e.g. more than one) messages in the same transaction to the receiver 21 during normal LPP (e.g. Capabilities Transfer, Assistance Data Transfer, Location Information Transfer) procedures for the control-plane. In the embodiment, the receiver 21 sends an LPP Request message to the sender as part of a new transaction with a transaction ID T in step S501.

The sender 22 sends the first message of the LPP messages carrying a sequence number $S_1$ to the receiver 21 in step S502. The first message includes a transaction ID T that is the same as in step S501, if step S501 occurred and does not indicate that the transaction T has ended. The first message with the sequence number $S_1$ requests for an LPP Acknowledgment from the receiver 21.

Then, the receiver 21 recognizes that the LPP/LPPe message will be transferred in a message of the LPP messages from the indication in step S502 that the transaction T has not ended. The receiver 21 acknowledges receipt of the message in step S502 by returning an LPP Acknowledgment to the sender 22 in S503. The receiver 21 may use the LPP Acknowledgment to control the transmit flow of the sender 22—e.g. the receiver 21 may delay sending the Acknowledgment until the receiver is ready to receive the next message segment. It is noteworthy that, the LPP Acknowledgment only confirms receipt of the first message with the sequence number $S_1$ in step S502 and does not confirm that the message was necessarily correct (e.g. decodable).

The sender 22 transfers and the receiver 21 acknowledges the LPP messages with sequence numbers $S_2$ to $S_i$ by repeating steps S502 and S503 in step S504. At any time during the transfer, either end may abort the transfer by sending an LPP Abort message to the other end. If the receiver 21 detects an error in a received LPP message from the sender 22, the receiver 21 transmits an LPP Error indication in step S505 and will not abort the transaction. Then, the receiver 21 decides to transmit an LPP Request message for requesting for the LPP message which the receiver 21 needs. In this embodiment, the receiver 21 detects an error in the message of the LPP messages with sequence number $S_3$, and then the receiver 21 transmits an LPP Request message for requesting the message of the LPP messages with the sequence number $S_3$ in step S506. In another embodiment, the receiver 21 may request for specific messages of the LPP messages that are required for recovery from the LPP Error indication. For example, the receiver 21 may transmit an LPP Request message for requesting specific messages of the LPP messages with the sequence number $S_2$ and $S_3$. In another embodiment, the receiver 21 may request for any previous messages of the LPP messages that it considers useful for recovery from the LPP Error indication. For example, the receiver 21 may transmit an LPP Request message for requesting for previous messages of the LPP messages with the sequence numbers $S_1$ and $S_2$. After receiving the LPP Request message in step S506, the sender 22 sends the sequence of the LPP messages with the sequence number $S_3$ to the receiver 21 in step S507. The receiver 21 acknowledges the message of the LPP messages with the sequence number $S_3$ and returns an LPP Acknowledgment to the sender 22 in step S508. Then, the sender 22 transfers and the receiver 21 acknowledges the LPP messages with the sequence numbers $S_4$ to $S_{n-1}$ by repeating steps S502 and S503 in step S509. Next, the sender 22 transfers the last ($n_{th}$) message of the LPP messages with the sequence number $S_n$ and requests for an Acknowledgment from the receiver 21 in step S510. The last message sent by sender 22 includes an indication that the message ended transaction T. Finally, the receiver 21 acknowledges the last message of the LPP messages and ends the transaction in step S511.

In another embodiment, if an LPP/LPPe message is a large volume of messages, segmented messages transfer can be used. Please refer to FIG. 6, which shows an LPP/LPPe segmented messages transfer procedure with resume capability based on a request made by a receiver according to an embodiment of the invention. The LPP/LPPe segmented messages transfer procedure is quite similar to the LPP messages transfer procedure, and reference to the steps of the LPP messages transfer procedure in FIG. 5, may be made to most of the LPP/LPPe segmented messages transfer procedure in FIG. 6.

Figure 6:
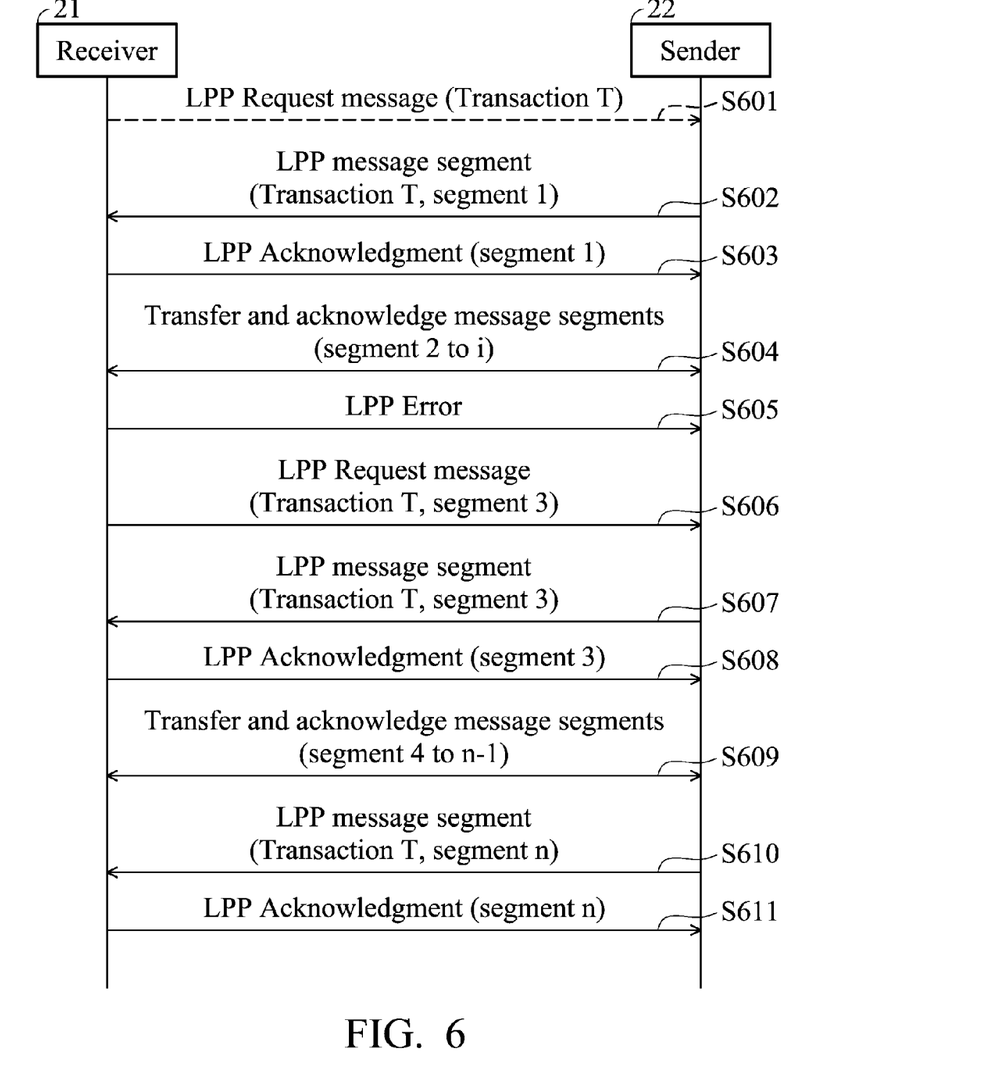
FIG. 6 is a diagram for illustrating an LPP/LPPe segmented messages transfer procedure with resume capability based on a request made by a receiver according to an embodiment of the invention.

FIG. 6 is a diagram for illustrating an LPP/LPPe message transfer procedure with resume capability based on a request made by a receiver according to an embodiment of the invention. As shown in FIG. 6, there is merely a receiver 21 and a sender 22 in this transfer procedure, wherein this transfer procedure may be used on the user plane. In the embodiment, the receiver 21 sends an LPP Request message to the sender as part of a new transaction with a transaction ID T in step S601. The receiver 21 may include a preference to transfer the LPP messages in a segmented form. Note that such a preference is not mandatory for the sender 22 (i.e. the step S601 can be ignored).

The sender 22 may divide the LPP/LPPe message to be transferred to the receiver 21 into n segments. Each segment of the LPP/LPPe messages must be capable of being transferred in a well formed LPP/LPPe message (i.e. a message that can be decoded and interpreted independently of any other message). The sender 22 sends the first segment of the LPP/LPPe message carrying a reliable transport segment number 1 to the receiver 21 in step S602. The segment includes a transaction ID T that is the same as in step S601, if step S601 occurred and does not indicate that the transaction T has ended. The first segment requests for an LPP reliable transport Acknowledgment from the receiver 21.

Then, the receiver 21 recognizes that the LPP/LPPe message will be transferred in a segment of the LPP/LPPe message from the indication in step S602 that the transaction T has not ended. The receiver 21 acknowledges receipt of the first segment in step S602 by returning an LPP Acknowledgment to the sender 22 in S603. The receiver 21 may use the LPP Acknowledgment to control the transmit flow of the sender 22—e.g. the receiver 21 may delay sending the Acknowledgment until the receiver is ready to receive the next message segment. It is noteworthy that, the LPP Acknowledgment only confirms receipt of the first segment in step S602 and does not confirm that the first segment was necessarily correct (e.g. decodable).

The sender 22 transfers and the receiver 21 acknowledges the LPP/LPPe message segments with the segment numbers 2 to i by repeating steps S602 and S603 in step S604. At any time during the transfer, either end may abort the transfer by sending an LPP Abort message to the other end. If the receiver 21 detects an error in a received LPP/LPPe message from the sender 22, the receiver 21 transmits an LPP Error indication in step S605 and will not abort the transaction. Then, the receiver 21 decides to transmit an LPP Request message for requesting for the LPP/LPPe message segment which the receiver 21 needs. In this embodiment, the receiver 21 detects an error in the segment of the LPP/LPPe messages with segment number 3, and then the receiver 21 transmits an LPP Request message for requesting the segment of the LPP/LPPe message with the segment number 3 in step S606. In another embodiment, the receiver may request for specific segments of the LPP/LPPe message that are required for recovery from the LPP Error indication. For example, the receiver 21 may transmit an LPP Request message for requesting specific segments of the LPP/LPPe message with the segment numbers 2 and 3. In another embodiment, the receiver may request for any previous segments of the LPP/LPPe message that it considers useful for recovery from the LPP Error indication. For example, the receiver 21 may transmit an LPP Request message for requesting previous segments of the LPP messages with the segment numbers 1 and 2. After receiving the LPP Request message in step S606, the sender 22 sends the segment of the LPP/LPPe message with the segment number 3 to the receiver 21 in step S607. The receiver 21 acknowledges the segment of the LPP/LPPe message with the segment number 3 and returns an LPP Acknowledgment to the sender 22 in step S608. Then, the sender 22 transfers and the receiver 21 acknowledges the LPP/LPPe message with the segment numbers 4 to n–1 by repeating steps S602 and S603 in step S609. Next, the sender 22 transfers the last ($n_{th}$) segment of the LPP/LPPe message with the segment number n and requests for an Acknowledgment from the receiver 21 in step S610. The last segment sent by the sender 22 includes an indication for ending the transaction T. Finally, the receiver 21 acknowledges the last segment of the LPP message and ends the transaction in step S611.

In the invention, two methods are provided for recovering from an LPP error indication in the LPP messages exchange without aborting the ongoing transfer of LPP information. Using these methods may prevent the discarding of earlier delivered/acknowledged messages in the transaction and may not abort the transaction.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling an error in Long Term Evolution Positioning Protocol (LPP) messages exchange, comprising:
   receiving, by a receiver, at least one of a plurality of LPP messages from a sender, wherein each of the LPP messages has a sequence number;
   returning, by the receiver, an acknowledgment to the sender for each of the at least one received LPP message;
   returning, by the receiver, an error indication to the sender when the receiver detects an error in the at least one received LPP message; and
   receiving, by the receiver, at least one of the at least one received LPP message retransmitted by the sender,
   wherein the receiver detects the error in a first LPP message of the at least one received LPP message, and the error indication includes the sequence number of the first LPP message.

2. The method in claim 1, wherein the at least one of the at least one received LPP message includes the first LPP message.

3. The method in claim 2, wherein the at least one of the at least one received LPP message includes all or part of the at least one received LPP message.

4. The method in claim 1, further comprising:
   transmitting, by the receiver, a request message to the sender after returning the error indication;
   wherein the sender retransmits the at least one of the at least one received LPP message to the receiver in response to the request message.

5. The method in claim 4, wherein the at least one of the at least one received LPP message is required for error recovery.

6. The method in claim 4, wherein the at least one of the at least one received LPP message includes the LPP message that originated the error.

7. A method for handling an error in Long Term Evolution Positioning Protocol (LPP) messages exchange, comprising:
   receiving, by a receiver, at least one of a plurality of message segments of a LPP extension (LPPe) message from a sender, wherein each of the message segments has a segment number;
   returning, by the receiver, an acknowledgment to the sender for each of the at least one received message segment;
   returning, by the receiver, an error indication to the sender when the receiver detects an error in the at least one received message segment; and
   receiving, by the receiver, at least one of the at least one received message segment retransmitted by the sender.

8. The method in claim 7, wherein the receiver detects the error in a first message segment of the at least one received message segment, and the error indication includes the segment number of the first message segment.

9. The method in claim 8, wherein the at least one of the at least one received message segment includes the first message segment.

10. The method in claim 9, wherein the at least one of the at least one received message segment includes all or part of the at least one received message segment.

11. The method in claim 7, further comprising:
    transmitting, by the receiver, a request message to the sender after returning the error indication;
    wherein the sender retransmits the at least one of the at least one received message segment to the receiver in response to the request message.

12. The method in claim 11, wherein the at least one of the at least one received message segment is required for error recovery.

13. The method in claim 11, wherein the at least one of the at least one received message segment includes the message segment that originated the error.

14. A system for handling an error in Long Term Evolution Positioning Protocol (LPP) messages exchange, comprising:
    a sender, transmitting at least one of a plurality of LPP messages, wherein each of the LPP messages has a sequence number; and
    a receiver, receiving the at least one of the LPP messages and returning an acknowledgment to the sender for each of the at least one received LPP message;
    wherein the receiver returns an error indication to the sender when the receiver detects an error in the at least one received LPP message, and the sender retransmits at least one of the at least one received LPP message to the receiver;
    wherein the receiver detects the error in a first LPP message of the at least one received LPP message, and the error indication includes the sequence number of the first LPP message.

15. The system in claim 14, wherein the receiver detects the error in a first LPP message of the at least one received LPP message, the error indication includes the sequence number of the first LPP message, and the at least one of the at least one received LPP message includes the first LPP message.

16. The system in claim 14, wherein the receiver transmits a request message to the sender after returning the error indication; wherein the sender retransmits the at least one of the at least one received LPP message in response to the request message.

17. A system for handling an error in Long Term Evolution Positioning Protocol (LPP) messages exchange, comprising:
    a sender, transmitting at least one of a plurality of message segments of a LPP extension (LPPe) message, wherein each of the message segments has a segment number; and
    a receiver, receiving the at least one of the message segments and returning an acknowledgment to the sender for each of the at least one received message segment;
    wherein the receiver returns an error indication to the sender when the receiver detects an error in the at least one received message segment, and the sender retransmits at least one of the at least one received message segment to the receiver.

18. The system in claim 17, wherein the receiver detects the error in a first message segment of the at least one received message segment, the error indication includes the segment number of the first message segment, and the at least one of the at least one received message segment includes the first message segment.

19. The system in claim 17, wherein the receiver transmits a request message to the sender after returning the error indication; wherein the sender retransmits the at least one of the at least one received message segment in response to the request message.

* * * * *